US008612743B2

(12) United States Patent
Holland et al.

(10) Patent No.: US 8,612,743 B2
(45) Date of Patent: Dec. 17, 2013

(54) WIRELESS NETWORK SECURITY

(75) Inventors: Gavin D. Holland, Oak Park, CA (US); Karim M. El Defrawy, Santa Monica, CA (US)

(73) Assignee: The Boeing Company, Chicago, IL (US)

(*) Notice: Subject to any disclaimer, the term of this patent is extended or adjusted under 35 U.S.C. 154(b) by 106 days.

(21) Appl. No.: 13/191,094

(22) Filed: Jul. 26, 2011

(65) Prior Publication Data
US 2013/0031358 A1 Jan. 31, 2013

(51) Int. Cl.
*H04W 12/00* (2009.01)

(52) U.S. Cl.
USPC ........... 713/153; 713/100; 709/223; 709/224; 709/225; 726/22; 726/23

(58) Field of Classification Search
USPC ............................ 726/6, 22–25; 709/223–225
See application file for complete search history.

(56) References Cited

U.S. PATENT DOCUMENTS

| | | | | |
|---|---|---|---|---|
| 5,991,881 A * | 11/1999 | Conklin et al. | ................. | 726/22 |
| 6,973,313 B1 * | 12/2005 | Sebastian | ...................... | 455/445 |
| 7,123,587 B1 * | 10/2006 | Hass et al. | ..................... | 370/238 |
| 7,310,669 B2 * | 12/2007 | Webb et al. | .................... | 709/224 |
| 7,624,445 B2 * | 11/2009 | Gupta et al. | .................... | 726/23 |
| 7,739,741 B2 * | 6/2010 | Saffre | ............................. | 726/26 |
| 7,849,502 B1 * | 12/2010 | Bloch et al. | .................... | 726/11 |
| 8,245,294 B1 * | 8/2012 | Zahra et al. | .................... | 726/22 |
| 2004/0039781 A1 * | 2/2004 | LaVallee et al. | ............. | 709/205 |
| 2004/0210767 A1 * | 10/2004 | Sinclair et al. | ................ | 713/201 |
| 2005/0204162 A1 * | 9/2005 | Rayes et al. | ................... | 713/201 |
| 2005/0278784 A1 * | 12/2005 | Gupta et al. | ..................... | 726/23 |
| 2006/0041653 A1 * | 2/2006 | Aaron | ............................. | 709/223 |
| 2006/0095961 A1 * | 5/2006 | Govindarajan et al. | ......... | 726/15 |
| 2006/0224724 A1 * | 10/2006 | Marinescu et al. | ........... | 709/224 |
| 2007/0217611 A1 * | 9/2007 | Weis | .............................. | 380/277 |
| 2010/0325272 A1 * | 12/2010 | Lloyd et al. | ................... | 709/224 |
| 2012/0023072 A1 * | 1/2012 | Garg | ............................... | 707/689 |
| 2012/0063595 A1 * | 3/2012 | Massoudi et al. | ............. | 380/210 |

FOREIGN PATENT DOCUMENTS

CN 101986741 A 3/2011
GB 2493265 A 1/2013

OTHER PUBLICATIONS

Anantvalee et al., A Survey on Intrusion Detection in Mobile Ad Hoc Networks, Wireless/Mobile Network Security, Chapter 7, Springer, 2006, (22 pgs).
Alexander et al., The Dynamic Community of Interest and Its Realization in ZODIAC, IEEE Communications Magazine, Oct. 2009, (8 pgs).

(Continued)

*Primary Examiner* — Linglan Edwards
(74) *Attorney, Agent, or Firm* — Toler Law Group, PC

(57) ABSTRACT

A method includes identifying a suspect node of a network that includes multiple nodes in wireless communication. The method also includes initiating formation of a sub-network of the network in response to identifying the suspect node. The suspect node is not a member of the sub-network. After formation of the sub-network, first communications between the suspect node and a device of the network are routed to or through at least one of the members of the sub-network. The sub-network is configured to enable second communications between members of the sub-network, where the second communications are communicated in a manner that is secured against access by the suspect node.

21 Claims, 8 Drawing Sheets

(56) References Cited

OTHER PUBLICATIONS

Buchegger et al., Performance Analysis of the CONFIDANT Protocol (Cooperation of Nodes: Fairness in Dynamic Ad-hoc NeTworks), MOBIHOC '02, Lausanne, Switzerland, Jun. 2002, (11 pgs).

Michiardi et al., CORE: A Collaborative Reputation Mechanism to enforce node cooperation in Mobile Ad hoc Networks, Proceedings of the IFIP TC6/TC11 Sixth Joint Working Conference on Communications and Multimedia Security, 2002, (15 pgs).

Bansal et al., Observation-based Cooperation Enforcement in Ad hoc Networks, http://arXiv.org > cs > arXiv: cs/0307012, Cornell University Library, Jul. 6, 2003, (10 pgs).

Kiraly et al., Traffic masking in IPsec: architecture and implementation, Mobile and Wireless Communications Summit 16th IST, Jul. 2007, (5 pgs).

Castro et al., Practical Byzantine Fault Tolerance and Proactive Recovery, ACM Transactions on Computer Systems (TOCS), vol. 20, No. 4, Nov. 2002, (64 pgs).

Search Report from the U.K Intellectual Property Office for Application No. GB1212911.0 dated Oct. 26, 2012; 1 page.

* cited by examiner

WIRELESS NETWORK SECURITY

FIELD OF THE DISCLOSURE

The present disclosure is generally related to wireless network security.

BACKGROUND

In wireless networks, communications may be performed using broadcast transmissions between nodes of the network. When a transmission is broadcast to a target node, a device other than the target node may detect or receive the transmission. Thus, wireless networks may be difficult to defend against malicious activity because every node of the wireless network may be exposed to direct attack (unlike wired networks where only nodes at a perimeter of the network may be exposed to attack from outside the network). Ad hoc wireless networks may be particularly vulnerable because membership in an ad hoc wireless network can be dynamic and controlled in a decentralized manner. Conventional methods for responding to attacks in such networks generally focus on isolating a malicious node from the network by refusing to provide the malicious node with access to network services.

SUMMARY

Systems and methods to automate defense of networks, especially broadcast wireless networks, are disclosed. In a particular embodiment, nodes of a network are operable to "sandbox" a suspicious node. That is, the suspicious node may be isolated in a manner that is transparent to the suspicious node, enabling other nodes of the network to protect the network from malicious activities of the suspicious node and enabling the other nodes to monitor activities of the suspicious node to gain information about the suspicious node.

In a particular embodiment, a method includes identifying a suspect node of a network that includes multiple nodes in wireless communication. The method also includes initiating formation of a sub-network of the network in response to identifying the suspect node. The suspect node is not a member of the sub-network. After formation of the sub-network, first communications between the suspect node and a device of the network are routed to or through at least one of the members of the sub-network. The sub-network is configured to enable second communications between members of the sub-network, where the second communications are communicated in a manner that is secured against access by the suspect node.

In a particular embodiment, a device includes a wireless network interface to facilitate wireless communication with nodes of a network and a processor coupled to the wireless network interface. The device also includes at least one memory device accessible to the processor. The at least one memory device stores processor-executable instructions that, when executed by the processor, cause the processor to identify a suspect node of the network and to initiate formation of a sub-network of the network in response to identifying the suspect node. The sub-network enables secure wireless communication between members of the sub-network, where the suspect node is not a member of the sub-network. After formation of the sub-network, the suspect node is still able to communicate via the network. After formation of the sub-network, communications between the suspect node and a device of the network may be routed to or through at least one of the members of the sub-network.

In a particular embodiment, a computer-readable medium includes processor-executable instructions that, when executed by a processor, cause the processor to identify a suspect node of a network that includes multiple nodes in wireless communication and, in response to identifying the suspect node, to initiate formation of a sub-network of the network by enabling secure wireless communication between members of the sub-network. The members of the sub-network include one or more neighbor nodes of the suspect node and do not include the suspect node. After formation of the sub-network, the one or more neighbor nodes communicate directly with the suspect node via the network and communicate with other members of the sub-network, but not the suspect node, via the sub-network.

The features, functions, and advantages that have been described can be achieved independently in various embodiments or may be combined in yet other embodiments, further details of which are disclosed with reference to the following description and drawings.

DETAILED DESCRIPTION

Figure 1:
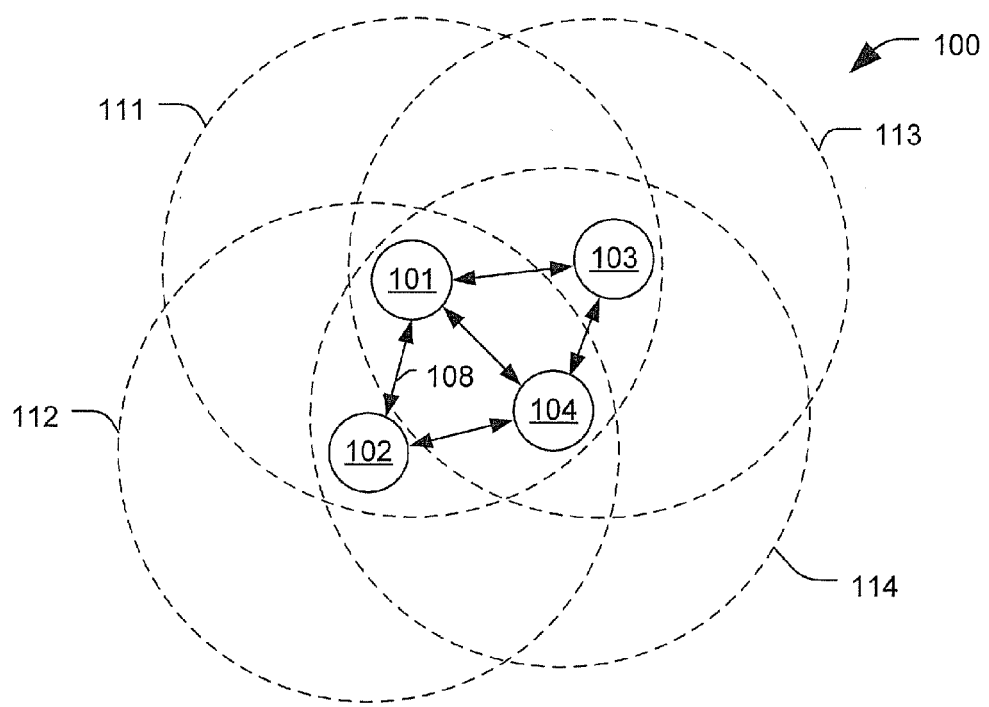
FIG. 1 is a first diagram illustrating a wireless network according to a particular embodiment.

In wireless networks (e.g., mobile ad hoc networks, sensor networks, wireless local area networks, vehicular ad hoc networks, etc.), network security can be a particular concern. In switched or wired networks only nodes at a perimeter of the network may be exposed to direct attack. However, in a wireless network, an attacker may be able to directly attack other nodes of the network, which may enable the attacker to gain access to the other nodes or to other portions of the network.

One way of addressing such concerns is to isolate a suspect node by refusing the suspect node access to network services in the network. However, simply refusing access to network service may have disadvantages. For example, refusing the suspect node access to network services may alert the suspect node that it has been detected. Alerting the suspicious node that it has been detected, may provide the suspicious node with information about detection mechanisms that are used on the network, which may enable the suspect node or a party controlling the suspect node to modify tactics to avoid detection of future attacks.

When the suspect node becomes aware that it has been detected, the suspect node may take action to prevent gathering of useful information about the suspect node. For example, the suspect node may have access to information related to an attacker or other malicious party associated with the suspect node (e.g., a network identity or address to which information is to be sent), information related to types of attacks that are to be executed, and so forth. When the suspect node becomes aware that it has been detected, the suspect node may take action to prevent this information from being gathered.

When the suspect node becomes aware that it has been detected, the suspect node may take actions that are harmful to the network. For example, the suspect node may report information regarding network topology, malicious node detection methods, etc. to a malicious party associated with the suspect node. In another example, the suspect node may change its mode of operation from attempting to infiltrate the network to attempting to jam the network, such as by sending unwanted signals that take up bandwidth and communication channels or that override valid communications between members of the network.

Additionally, cutting off communications with the suspect node may eliminate an opportunity to actively probe the suspect node. For example, if the suspect node remains in the network and is not alerted that it has been detected, other members of the network (e.g. other nodes of the network) may be able to exploit the suspect node to gain information about the suspect node or about a party behind the suspect node. In another example, the other members of the network may provide false information to the suspect node for counter-intelligence purposes or in an attempt to gain information about the suspect node. Additionally, the communications to and from the suspect node may be analyzed to improve network security.

As one example of a countermeasure that may be employed, one or more of the members of the network may also set up a "honey pot" or "honey network." A honey pot refers to a fake node or other network element that is configured to attract the suspect node. For example, the honey pot may be implemented as a virtual machine operating on one of the nodes of the network. A honey network is a set of fake nodes, or a network of honey pots. The honey pot or honey network may be used to entice the suspect node to implement a malicious action (such as attempting to gain access). Actions of the suspect node relative to the honey pot or honey network may be monitored to gain information about the suspect node.

Accordingly, isolating and controlling a suspect node within an ad hoc wireless network while allowing the suspect node to continue to communicate in a controlled fashion via the network (referred to herein as "sandboxing" the suspect node) may have significant benefit to improve the security of the wireless ad hoc network. Additionally, sandboxing the suspect node may be useful to gather information about the suspect nodes and techniques used by the suspect node. Further, sandboxing the suspect node may be used to provide false or misleading information to the suspect node as a countermeasure.

FIG. 1 is a diagram illustrating a wireless network 100 according to a particular embodiment. The wireless network 100 includes a plurality of nodes, including a first node 101, a second node 102, a third node 103, and a fourth node 104. The nodes 101-104 of the wireless network 100 communicate by wireless signals within a particular coverage area associated with each of the nodes 101-104. For example, the first node 101 has a first wireless coverage area 111. In the particular embodiment illustrated, the first wireless coverage area 111 is sufficiently large that the first node 101 is able to communicate directly with each of the other nodes 102-104 as indicated by the other nodes 102-104 falling within the first wireless coverage area 111. Likewise, the fourth node 104 has a fourth wireless coverage area 114 that includes each of the other nodes 101-103. The second node 102 has a second wireless coverage area 112 that is sufficient to enable the second node 102 to communicate directly with the first node 101 and the fourth node 104. The second wireless coverage area 112 is too small to enable direct communication between the second node 102 and the third node 103. Accordingly, communications from the second node 102 to the third node 103 may be routed through one or more of the first node 101 and the fourth node 104. The third node 103 has a third wireless coverage area 113 that is too small to encompass the second node 102 but that does include the first node 101 and the fourth node 104. Accordingly, the third node 103 can communicate directly with the first node 101 and the fourth node 104; however, communications to the second node 102 may be routed from the third node 103 through one or more of the first node 101 and the fourth node 104.

In FIG. 1, the wireless network 100 is illustrated as including four nodes 101-104; however, the wireless network 100 may include more than four nodes or fewer than four nodes. Additionally, the number and configuration of nodes in the wireless network 100 may be dynamic. For example, one or more of the nodes 101-104 may be a mobile node that is able to move into or out of range of the other nodes of the wireless network 100 over a period of time. Further, the wireless coverage areas 111-114 of one or more of the nodes 101-104 may be dynamic as a result of power savings considerations, terrain, environmental conditions, and so forth. Additionally, one or more of the nodes 101-104 may be coupled to one or more of the other nodes 101-104 or other nodes (not shown) of the wireless network 100 via a wired signal path. Thus, the designation "wireless network" indicates that at least one communication path of the wireless network 100 is wireless and does not indicate that the wireless network 100 has no wired communication paths.

In a particular embodiment, the wireless network 100 is an ad hoc network. For example, membership in the wireless network 100 and particular communication routes used between members of the wireless network 100 may be dynamic and may be controlled by the nodes 101-104 in an ad hoc fashion. To illustrate, one or more of the nodes 101-104 may be operable to discover other nodes of the wireless network 100 dynamically and to arrange communications 108 with the other nodes of the wireless network 100 automatically.

In a particular embodiment, the nodes 101-104 of the network 100 may be operable to detect a suspicious node within the network 100. The nodes 101-104 may also be operable to implement a process to "sandbox" the suspicious node within the network 100, as described in more detail below. For purposes of explanation, the fourth node 104 is described herein as a suspect node. That is, one or more of the other nodes 101-103 has performed a malicious node detection process and has identified the fourth node 104 as suspicious. In the embodiment illustrated in FIG. 1, the suspect node 104 is positioned such that it is able to intercept wireless communications from each of the other nodes 101-103. For example, when the first node 101 sends a communication to the second node 102, the first node 101 may use a broadcast transmission. Thus, other devices within the first wireless communication area 111 besides the second node 102 may be able to receive the broadcast transmission. For example, the suspect node 104 may be able to receive the transmission. The communications 108 (also referred to herein as "first communications 108" to distinguish communications of a sub-network) within the wireless network 100 may be encrypted in a manner that inhibits decryption of the first communications 108 by any node except an intended destination node (the second node 102 in the example above).

The encryption may be performed using public key encryption or shared key encryption. For example, using public key encryption, each of the nodes 101-104 may have a decryption key that is known only to that node and each other node may have access to a corresponding public encryption key. To illustrate, the first node 101 may have a private decryption key that only the first node 101 has access to. Each other node 102-104 may have access to a corresponding public encryption key. Thus, the other nodes 102-104 may encrypt messages to the first node 101 using the public encryption key and the first node 101 may decrypt these communications using the first node's private decryption key.

In an embodiment that uses public key encryption, a certification authority (not shown) issues each node $n_i$ of the network 100 a public-key certificate $pc(n_i)$. The public-key certificate may include an identifier of the node $id(n_i)$, a public key of the node $pK(n_i)$, a digital signature of the certification authority $sig(pc(n_i))$, other information related to encryption or key management, or any combination thereof. The certification authority may also issue a root certificate $rc(CA)$ to each of the nodes 101-104. The root certificate may include a public-key of the certification authority $pk(CA)$, which may be used to verify the digital signature $sig(pc(n_i))$. The public-key certificates may be issued offline, before the nodes 101-104 are used or deployed. Other nodes may be added to the network 100 later after the other nodes have obtained their own public-key certificates from the certification authority. One possible choice of format for the public-key certificates would be the X.509 standard digital certificate.

In an embodiment that uses shared key encryption, each pair of nodes may share at least one key that these nodes use to encrypt communications between them. For example, the first node 101 and the second node 102 may each have access to at least one shared key that the other nodes 103-104 do not have access to. When the first node 101 sends a message to the second node 102, the first node 101 may encrypt the message using the shared key associated with the second node 102. In this manner, the suspect node 104 may be able to receive communications within the wireless network 100, but is not able to access plaintext of these communications unless the received communication is directed to the suspect node 104. In this embodiment, an authority may issue every pair of nodes (e.g., $n_i$, $n_j$) a unique symmetric key $k_{ij}$. The pair of nodes may use the symmetric key to encrypt and decrypt all communication between them. Issuance of the keys may be performed offline, before the nodes 101-104 are used or deployed. Additional nodes may be added to the network later after the additional nodes have been issued appropriate pairwise keys and have exchanged keys with those nodes to which the additional nodes will communicate.

The first communications 108 may be secured using one or more of the encryption techniques described above and using an ad hoc network administration protocol. For example, each node $n_i$ of the network 100 may implement a "Hello" protocol. The Hello protocol may be implemented as part of a routing protocol, such as Optimized Link State Routing (OLSR) protocol. The node $n_i$ may include its public-key certificate $pc(n_i)$ in each "Hello" message. When another node $n_j$ receives a Hello message from the node $n_i$, the other node $n_j$ may authenticate the Hello message using the public-key certificate $pc(n_i)$ and the digital signature of the certification authority $sig(pc(n_i))$. Thus, the first communications 108 between members of the network 100 may be secured and authenticated.

While encryption may prevent the suspect node 104 from accessing plaintext of the first communications 108, the suspect node 104 may still be able to gather information about the first communications 108 by monitoring which of the nodes 101-103 communicate with which other nodes 101-103 and at when. In a particular embodiment, the nodes 101-104 implement a traffic masking process. A traffic masking process refers to a process that obscures a pattern of the first communications 108 of the wireless network 100. For example, the traffic masking process may use statistical techniques to introduce packet padding, fragmentation, and dummy packets into the first communications 108. The traffic masking process may also obscure network topology information from the suspect node 104. For example, the traffic masking process may manipulate delay in forwarding packets. Thus, when the suspect node 104 is sandboxed, the traffic masking process may obscure a pattern of the first communications 108 between the other nodes 101-103 of the network 100 from the suspect node 104.

In a particular embodiment, the traffic masking process may apply encryption of the first communications 108 at a link layer. In many broadcast networks, although transmissions are broadcast by the physical layer, the link-layer header in the packet contains a link-layer (MAC) destination address. Hiding the address by encrypting at the link layer may facilitate masking a pattern of the first communications 108 and may force every packet to use a broadcast destination address.

To sandbox the suspect node 104, the first node 101, the second node 102, or the third node 103 may initiate formation of a sub-network of the network 100. For example, referring to FIG. 2, the network 100 is illustrated with the suspect node 104 sandboxed. In particular, a sub-network 202 has been formed within the network 100. Within the sub-network 202, the first node 101, the second node 102, and the third node 103 are able to communicate using second communications 208 that are distinct from the communications 108 between the members of the network 100. For example, the second communications 208 may be secure against access by the suspect node 104.

As explained above, the nodes 101-104 may use a traffic masking process for the first communications 108. The second communications 208 may be obscured from detection by the suspect node 104 using the traffic masking process. The second communications 208 may also be encrypted, as described above with respect to the first communications 108. Thus, the suspect node 104 may be unable to detect existence of the sub-network 202. For example, the traffic masking process may cause each of the nodes 101-104 to inject packet padding and dummy packets into the first communications 108. The dummy packets may be generated and inserted via a statistical process that obfuscates a pattern of the first communications 108 within the network 100 from external entities, such as parties attempting to listen to the first communications 108. The members of the sub-network 202 may send the second communications 208 using the traffic masking process. For example, the second communications 208 may be transmitted in place of one or more dummy packets that would be used by the traffic masking process in relation to the first communications 108. To illustrate, when the traffic masking pattern determines that a dummy packet is to be transmitted to obscure the pattern of the first communications 108, a packet of the second communications 208 may be substituted for or transmitted instead of the dummy packet. Accordingly, the members of the sub-network 202 may replace dummy data packets or other portions of the traffic masking process with the second communications 208 in a manner that prevents or obfuscates existence of the sub-network 202 from the suspect node 104.

The members of the sub-network 202 may communicate via the second communications 208 to coordinate a countermeasure related to the suspect node 104. The suspect node 104 is able to communicate via the first communications 108 as though the sub-network 202 had not been formed and, thus, may not be able to detect existence of the sub-network 202. Since the suspect node 104 is not alerted that it has been detected, the members of the sub-network 202 may be able to gather information related to the suspect node 104, to provide counter intelligence information to the suspect node 104, to prepare countermeasures related to the suspect node 104, to perform other security processes, or any combination thereof. For example, one or more members of the sub-network 202 may generate a honey pot or a honey network, as described further with reference to FIG. 6, to entice the suspect node 104 to attempt to gain access to the honey pot or honey network.

In another example, the members of the sub-network 202 may selectively "lose" (i.e., intentionally drop) certain communications that are directed to or are received from the suspect node 104. To illustrate, one or more of the nodes, such as the first node 101, may be an infrastructure node that is coupled to another network 204. In its role as an infrastructure node, the first node 101 may act as a gateway between the other nodes 102-104 of the network 100 and the other network 204. The members of the sub-network 202 may prevent communications 108 of the suspect node 104 from being sent to the other network 204 or from being received by the suspect node 104 from the other network 204.

Figure 2:
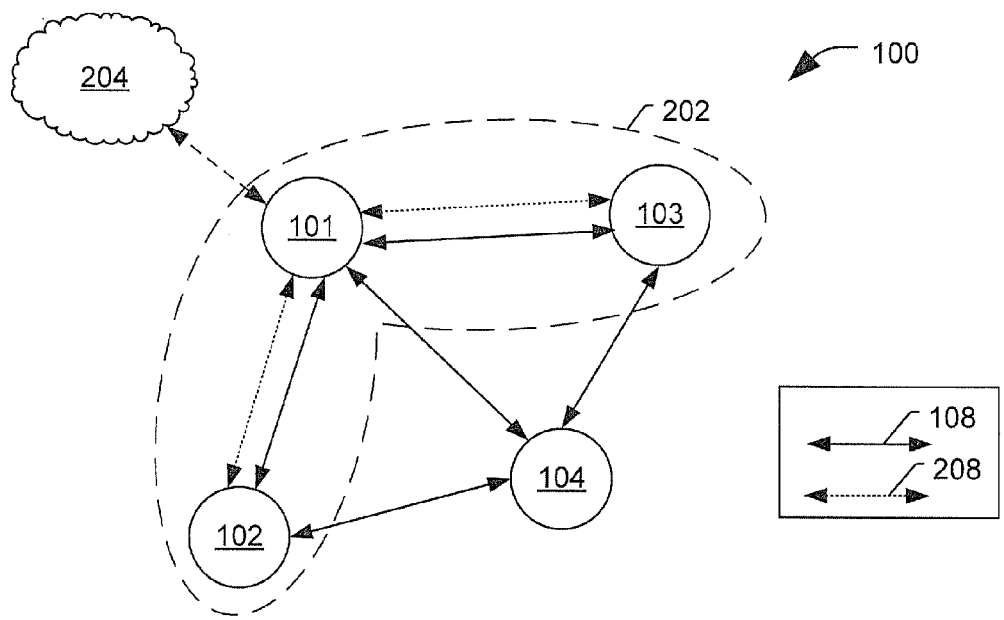
FIG. 2 is a second diagram illustrating the wireless network of FIG. 1 according to a particular embodiment.

In another example, the network 100 may include other nodes that are not shown in FIG. 2 and the members of the sub-network 202 may be nearest neighbors of the suspect node 104 within the network 100. In this example, the members of the sub-network 202 may act as a firewall that filters or blocks communications between the suspect node 104 and the other members of the network 100. In a particular example, the members of the sub-network 202 may agree (using the second communications 208) to drop chat related data packets to or from the suspect node 104 thereby disabling real time chat communications to and from the suspect node 104. In this example, particular communications to or from the suspect node 104 are disabled in a manner that appears to the suspect node 104 to be merely a normal wireless network communication error and therefore minimizes risks of alerting the suspect node 104 that it has been detected.

Figure 3:
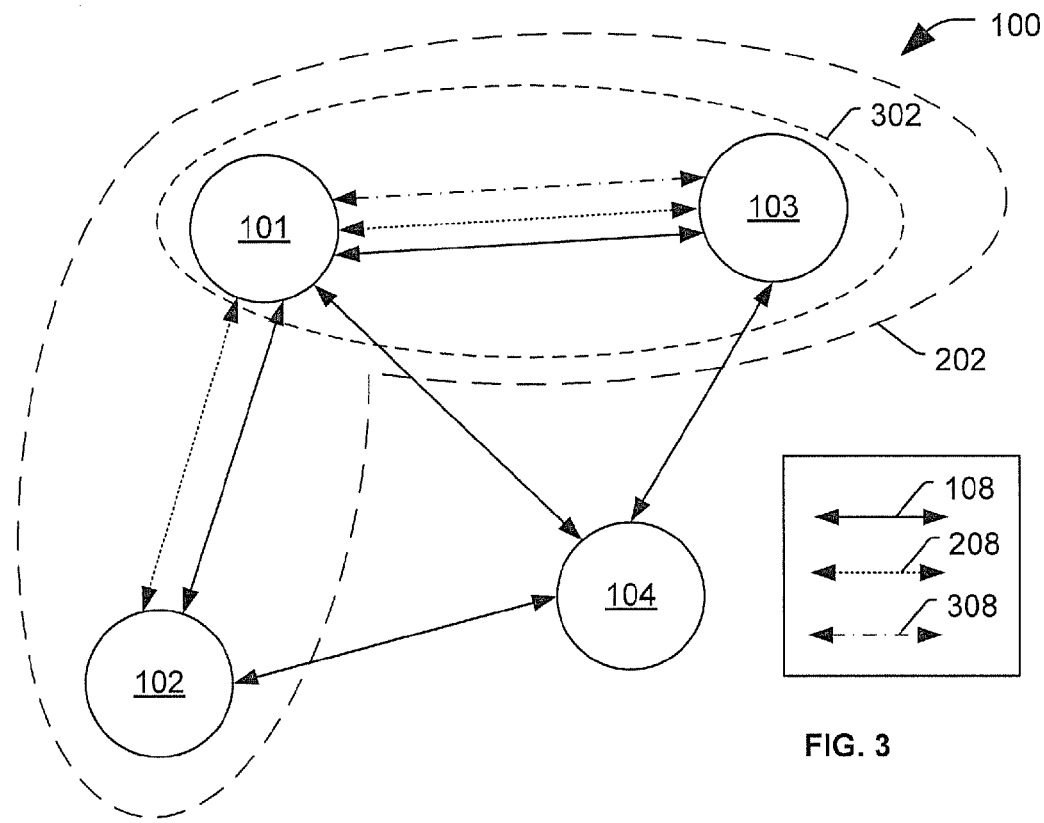
FIG. 3 is a third diagram illustrating the wireless network of FIG. 1 according to a particular embodiment.

FIG. 3 is a third diagram illustrating the wireless network 100 of FIG. 1 according to a particular embodiment. In particular, FIG. 3 illustrates a circumstance in which a status of a member of the sub-network 202 changes from trusted to suspect. In the embodiment illustrated in FIG. 3, a member of the sub-network 202 has been identified as a suspect node. For purposes of description, the second node 102 is designated as a second suspect node 102 in the description of FIG. 3 to identify the second suspect node 102 as the member of the first sub-network 202 that is suspicious.

In response to one of the first node 101 and the third node 103 determining that the second suspect node 102 is suspicious (e.g., using a malicious node detection process), formation of a second sub-network 302 may be initiated. The second sub-network 302 may be formed between trusted members of the first sub-network 202 in a similar manner to the formation of the first sub-network 202. That is, the second sub-network 302 may be a subset of or nested within the first sub-network 202. Communications between members of the network 100 may continue via the first communications 108. Additionally, the members of the first sub-network 202 may continue to communicate using the second communications 208 that are not accessible to the suspect node 104. Further, the members of the second sub-network 302 may communicate using third communications 308 that are not accessible to the second suspect node 102 and are not accessible to the suspect node 104. A pattern of the third communications 308 may be obscured using the traffic masking process described above. Thus, the suspect node 104 may not be alerted to the existence of the first sub-network 202 and may not be alerted to the existence of the second sub-network 302. The second suspect node 102 may be aware of (and a member of) the first sub-network 202 but may not be aware of the existence of the second sub-network 302.

The members of the second sub-network 302 (e.g., the first node 101 and the third node 103) may communicate via the third communications 308 with respect to the second sub-network 302. Thus, the second sub-network 302 may be used to gain information about the suspect node 104, the second suspect node 102, interactions between and combined efforts of the suspect nodes 102 and 104, or any combination thereof. The second sub-network 302 may also facilitate providing counter intelligence to the suspect nodes 102 and 104. For example, particular false information may be provided to the first suspect node 104 and subsequently information confirming the particular false information may be provided to the second suspect node 102.

Figure 4:
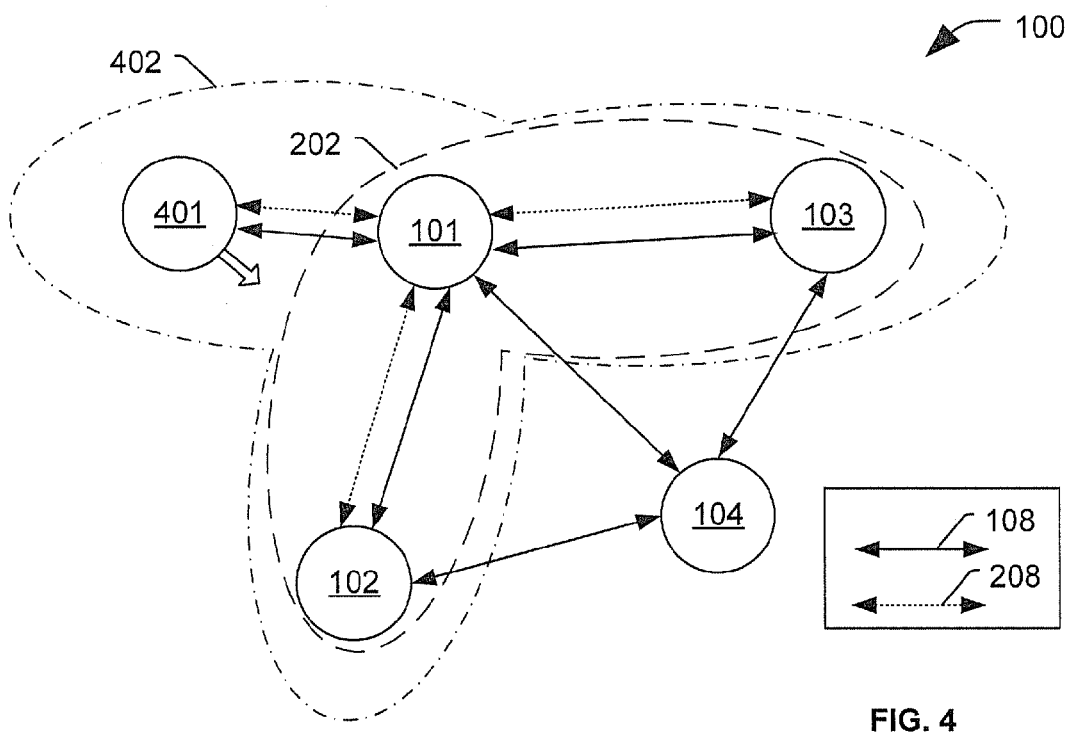
FIG. 4 is a fourth diagram illustrating the wireless network of FIG. 1 according to a particular embodiment.

FIG. 4 is a fourth diagram illustrating the wireless network 100 of FIG. 1 according to a particular embodiment. The embodiment illustrated in FIG. 4 relates to addition of a fifth node 401 to the network 100. For example, the fifth node 401 may be a mobile node that has moved within a range of the network 100 such that the first communications 108 are enabled between the fifth node 401 and one or more of the other nodes 101-104 of the network 100. The other nodes 101-104 of the network 100 may incorporate the fifth node 401 into the network 100 automatically using an ad hoc network configuration process. The ad hoc network configuration process may enable the nodes 101-104 to share information about the network 100 (e.g., network topology, protocols, etc.) with the fifth node 401 and to exchange encryption and other communication information with the fifth node 401 to enable the fifth node 401 to participate in the first communications 108 of the network 100.

After the fifth node 401 becomes a member of the network 100, the members of the sub-network 202 may determine whether the fifth node 401 is trustworthy. For example, one or more of the members of the sub-network 202 may analyze the fifth node 401 using a malicious node detection process. The members of the sub-network 202 may share information regarding the fifth node 401 via the second communications 208. When consensus of members of the sub-network 202 is used to make a decision, such as to decide whether the fifth node 401 trustworthy, a robust distributed consensus protocol, such as the Byzantine Paxos protocol, may be used to determine when consensus is reached.

If the members of the sub-network 202 reach agreement that the fifth node 401 is trustworthy, the fifth node 401 may be invited to join the sub-network 202. For example, a sub-network invitation message may be sent to the fifth node 401.

When the fifth node 401 agrees to join the sub-network 202 (e.g., by sending an acceptance of the invitation message), the sub-network 202 may be expanded to become an expanded sub-network 402 illustrated in FIG. 4.

In a particular embodiment, the sub-network 202 may be expanded to the expanded sub-network 402 without being reformed. For example, the expanded sub-network 402 may be formed by sending sub-network encryption information and other sub-network administration information (e.g., a member roster and a time-to-live of the sub-network) to the fifth node 401. Updated roster information may also be sent to the members of the sub-network 202 to indicate that the fifth node 401 is a member of the expanded sub-network 402.

In another particular embodiment, the expanded sub-network 402 is formed by dissolving the sub-network 202 and forming the expanded sub-network 402 as a new sub-network. In this embodiment, the expanded sub-network 402 may be assigned a new time-to-live, new encryption information, and so forth. After the expanded sub-network 402 is formed, resources of the fifth node 401 may be utilized to gather information about the suspect node 104 and to prevent the suspect node 104 from causing harm to or gathering sensitive information via the network 100.

Figure 5:
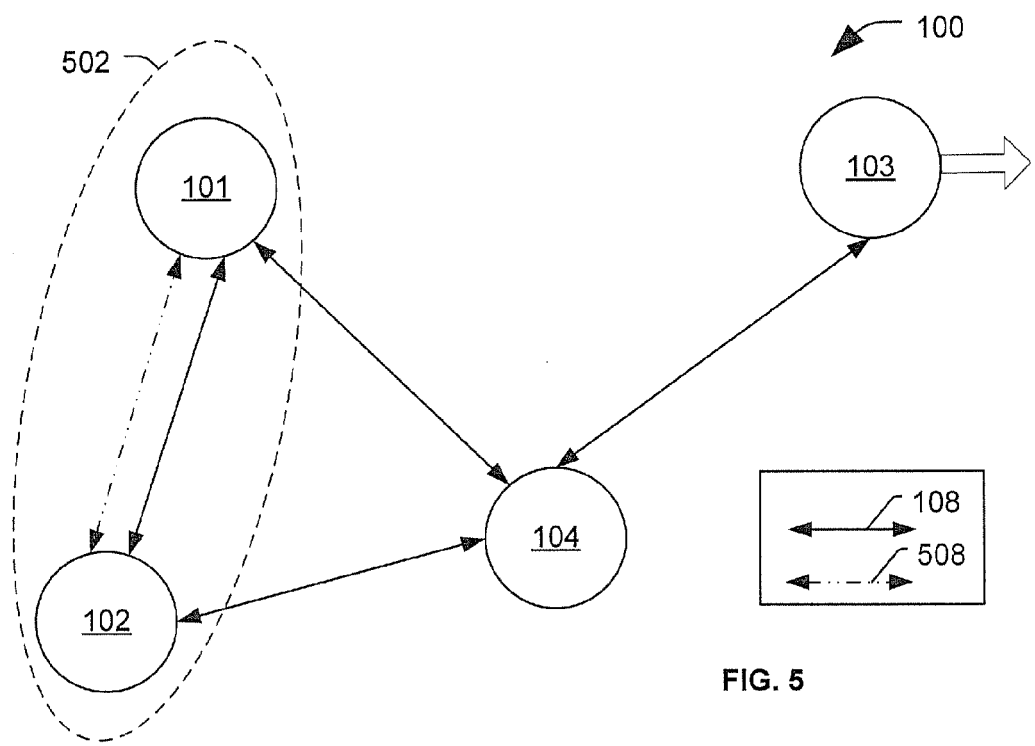
FIG. 5 is a fifth diagram illustrating the wireless network of FIG. 1 according to a particular embodiment.

FIG. 5 is a fifth diagram illustrating the wireless network 100 of FIG. 1 according to a particular embodiment. In particular, FIG. 5 illustrates a circumstance in which a status of a member of the sub-network 202 (not shown in FIG. 5) has changed. In FIG. 5, the third node 103 has disconnected from or moved out of communication range with other members of sub-network 202 (not shown in FIG. 5). The third node 103 may be able to communicate with the first node 101 and the second node 102 by routing the first communications 108 through the suspect node 104. However, the third node 103 may chose not to send second communications 208 (not shown in FIG. 5) associated with the sub-network through the suspect node 104 since this may, for example, alert the suspect node 104 of the existence of the sub-network, or allow the suspect node 104 to disturb first and second communications of the third node 103. Further, after the third node 103 leaves secure communications of the sub-network, trustworthiness of the third node 103 may need to be reevaluated.

In response to the third node 103 disconnecting from or leaving the network 100 or leaving the sub-network, the remaining members of the sub-network (e.g., the first node 101 and the second node 102) may initiate formation of a new sub-network 502. The new sub-network 502 may be configured to enable members of the new sub-network 502 to communicate via fourth communications 508. Additionally, after formation of the new sub-network 502, the members of the network 100 (including the suspect node 104) may communicate via the first communications 108. The fourth communications 508 may be secure against access by the suspect node 104 and may be secure against access by the third node 103. For example, the fourth communications 508 may be encrypted using an encryption key that is generated when the new sub-network 502 is formed. In the event that the status of the third node 103 changes again in a manner that enables the third node 103 to communicate directly with the first node 101 or the second node 102, the third node 103 may be treated like a new node of the network 100, as described with reference to FIG. 4. For example, the first node 101 and the second node 102 may evaluate trustworthiness of the third node 103 and may invite the third node 103 to join the new sub-network 502 if the third node 103 is determined to be trustworthy.

Figure 6:
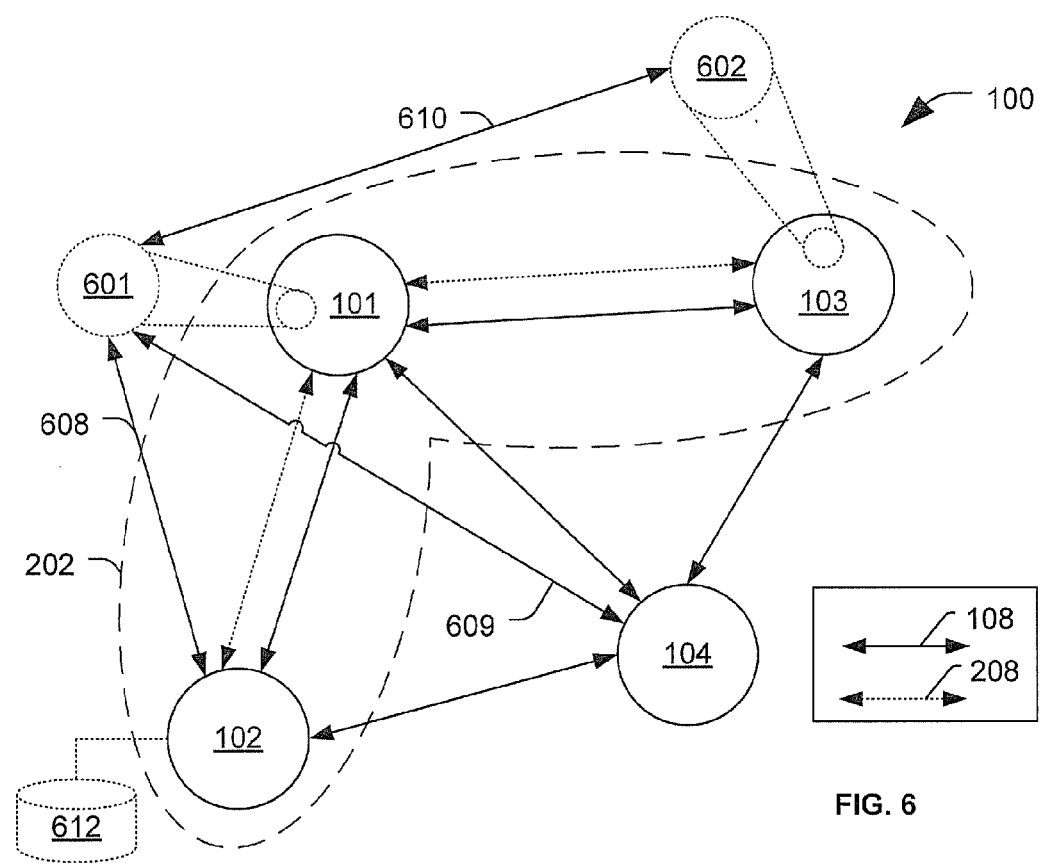
FIG. 6 is a sixth diagram illustrating the wireless network of FIG. 1 according to a particular embodiment.

FIG. 6 is a sixth diagram illustrating the wireless network 100 of FIG. 1 according to a particular embodiment. The particular embodiment illustrated in FIG. 6 shows activities that may be performed by one or more of members of the sub-network 202 in order to gain information about the suspect node 104. The activities performed may include passive traffic monitoring. For example, one or more of the members of the sub-network 202 may maintain a log 612 of communication traffic going to and coming from the suspect node 104. Information in the log 612 may be used, for example, in offline forensic analysis or in a supporting role for active exploits.

In the example of FIG. 6, one or more of the members of the sub-network 202 may instantiate a virtual machine that acts as a honey pot or honey network. For example, the first node 101 may instantiate a first honey pot 601. The first honey pot 601 may be implemented as instructions that execute in a virtual machine of the first node 101.

The first honey pot 601 may behave in a manner that simulates existence of another network resource (e.g., another node of the network 100 or an infrastructure resource). To illustrate, the first honey pot 601 may communicate on the network 100 by sending transmissions 608-610 using transmitting resources of the first node 101. The transmissions 608-610 initiated by the first honey pot 601 may include information (e.g., a packet header) indicating that the transmissions 608-610 are from the first honey pot 601 (i.e., from a network resource distinct from the first node 101). The honey pot 601 may send the transmissions 608 to other members of the network 100, may send the transmissions 609 to the suspect node 104, may send the transmissions 610 to other honey pots 602 (thereby forming a honey network), may send transmissions to other network resources (not shown), or any combination thereof. The first honey pot 601 may advertise network resources and may respond to messages from other members of the network 100, such as the suspect node 104. Thus, the suspect node 104 may identify existence of the first honey pot 601 and may attempt communications with the first honey pot 601 or may attempt to access network resources via the first honey pot 601 in a manner that provides information to members of the sub-network 202 about techniques used by the suspect node 104 to gain network access or to perform other malicious activities.

Figure 7:
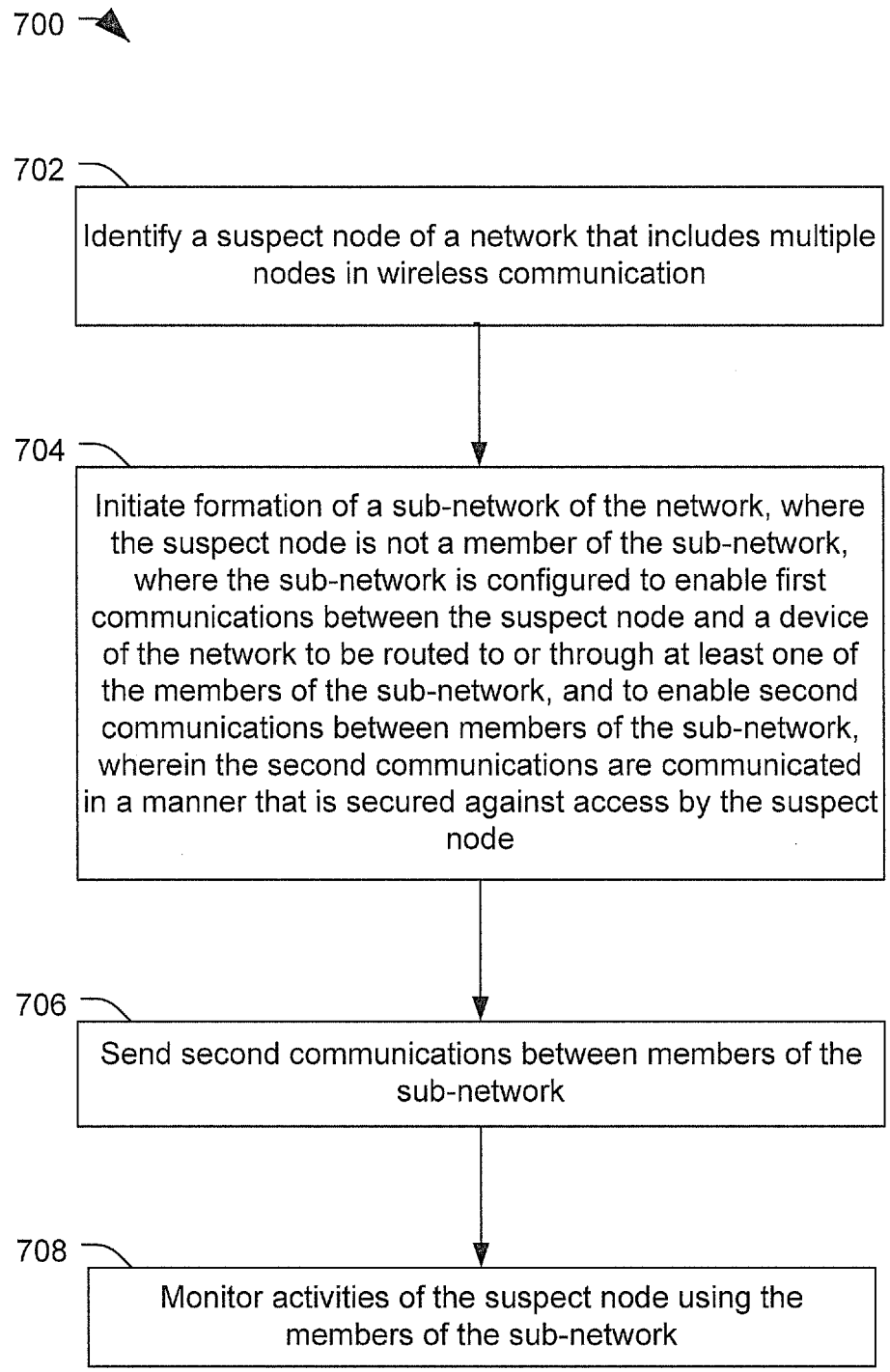
FIG. 7 is a flow chart of a particular embodiment of a method of providing security for a wireless network.

FIG. 7 is flow chart of a particular embodiment of a method 700 of providing security for a wireless network. The method 700 may be performed by a node of a wireless network, such as one of the nodes 101-104 of the network 100 illustrated and described with respect to FIGS. 1-6. For example, the network may include multiple member nodes in wireless communication. As described with reference to FIGS. 1-6, the members of the network may communicate wirelessly in a secure manner using encryption, traffic masking, or both. Additionally, the network may be an ad hoc network in which members of the network may be added or changed over time automatically The method 700 may include, at 702, identifying a suspect node of the network. For example, one or more nodes of the network may implement a malicious node detection process and may detect suspicious activity of the suspect node. The method 700 may include, at 704, initiating formation of a sub-network of the network in response to identifying the suspect node. The sub-network may be formed such that the suspect node is not a member of the sub-network. The sub-network may be configured to enable first communications between the suspect node and another device of the network to be routed to or through one or more members of the sub-network. For example, from the perspective of the suspect node, it may not be apparent that the sub-network has been formed. The sub-network may also enable second communications between members of the sub-network in a manner that is secure against access by the suspect node. To illustrate, the communications performed on the network before the suspect node is detected may continue; however, the sub-network or members of the sub-network may monitor communications to and from the suspect node and may perform other activities relative to those communications in order to prevent the suspect node from causing harm within the network.

In a particular embodiment, the nodes use a secure group formation protocol to form and maintain a secure communication group (e.g., a sub-network) within a network such that group membership is obfuscated from non-members. For example, after a particular node, such as the first node 101 of FIGS. 1-6, has determined that a sub-network should be formed in response to detection of a suspicious node, e.g., the suspect node 104, the first node 101 may generate a roster of nodes that are authorized to be members of the sub-network. For example, the first node 101 may determine that the second node 102 and the third node 103 are trustworthy and may add identifiers of the second node 102 and the third node 103 to the roster for the sub-network.

The first node 101 may transmit a group announcement message G to each node in the roster. The group announcement message G for a particular node $n_i$ may be encrypted using an encryption key $k_i(n_i)$ that is associated with the particular node $n_i$. For example, the group announcement message sent from the first node 101 to the second node 102 may be encrypted using encryption information associated with the second node 102. The encryption information associated with the second node 102 may include a public key of the second node 102 that is available to the first node 101 or a pairwise key that is shared by the first node 101 and the second node 102. Similarly, the group announcement message sent from the first node 101 to the third node 103 may be encrypted using encryption information associated with the third node 103.

In response to the group announcement message, one or more nodes that were invited to the sub-network may respond with a membership request message. The membership request message received from each invited node may be encrypted using encryption information associated with the node that sent the group announcement message, e.g., the first node 101 in the example above. If no response is received from one or more invited nodes during a delay period, the first node 101 may send a new group announcement message to those particular nodes, to a subset of the invited nodes, or to every invited node. A length of the delay period may be randomized to reduce a likelihood of detection of communications related to formation of the sub-network.

When the first node 101 has received a membership request from each invited node, the first node 101 may generate a one-time group key $gk(n_i)$ and determine a time-to-live (ttl) for the sub-network. The first node 101 may send a membership confirmation message to each member of the sub-network. The membership confirmation message sent to a particular node may be encrypted using encryption information associated with the particular node, e.g., the key $k_i(n_i)$. The membership confirmation message may include administration information associated with the sub-network, such as the roster of members, the one-time group key $gk(n_i)$, the time-to-live ttl, and an identifier of the node that initiated formation of the sub-network, e.g., the first node 101 in this example.

After receiving the membership confirmation message, the members of the sub-network may encrypt communications related to the sub-network using the one-time group key $gk(n_i)$ until expiration of the time-to-live or until another change in the network or the sub-network causes the sub-network to be dissolved. After the time-to-live expires, the first node 101 (or another member of the sub-network) may initiate reformation of the sub-network. The sub-network may be reformed with a new one-time key $gk(n_i)$ and a new time-to-live. After the sub-network is dissolved, further communications using the previous one-time key $gk(n_i)$ may be ignored or may be used as indication of suspicious activity on the part of a particular node. After a particular node initiates formation of the sub-network (e.g., by sending a group announcement message) related to a particular suspect node, other attempts to form a sub-network related to the suspect node may be terminated to avoid forming multiple sub-networks related to the same suspect node.

The first node 101 may expand the sub-network to a new node without reforming the sub-network by sending a new membership confirmation message to other members of the expanded sub-network (including the new node). The new confirmation message may include the identifier of the first node 101, an updated roster of the sub-network, the one-time key $gk(n_i)$ of the sub-network, and the time-to-live of the sub-network. When a member of the sub-network is to be excluded from the sub-network, the sub-network may be dissolved and reformed without the excluded member.

After the sub-network is formed, the method 700 may include, at 706, sending second communications between members of the sub-network. The second communications may include information about the suspect node, information related to the sub-network, or a combination thereof. The method 700 may also include, at 708, monitoring activities of the suspect node using one or more of the members of the sub-network.

Figure 8:
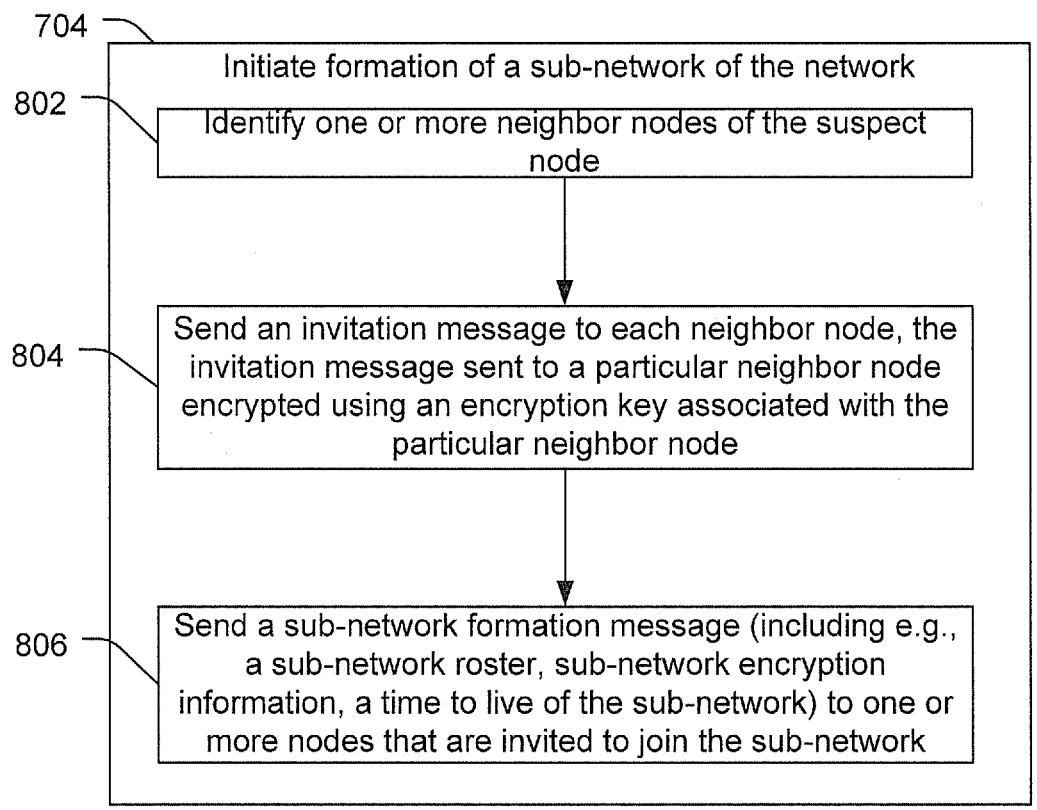
FIG. 8 is a flow chart of a particular embodiment of a method of initiating formation of a sub-network of a network.

FIG. 8 is flow chart of a particular embodiment of a method of initiating formation of a sub-network of a network. In particular, FIG. 8 provides additional detail regarding a particular method of forming the sub-network, which may correspond to the method 704 of initiating formation of a sub-network of FIG. 7. The method 704 may be performed by a node of a network, such as one of the nodes 101-104 of the wireless network 100 of FIGS. 1-6.

The method 704 may include, at 802, identifying one or more neighbor nodes of the suspect node. For example, in certain ad hoc networks each member of the network may communicate digest information to other members of the network. The digest information of a particular node may identify the particular node's neighbors. In certain embodiments, the digest information also identifies second level neighbors (or "two-hop neighbors"). The digest information may be used to identify the neighbor nodes of the suspect node.

In a particular embodiment, the one or more neighbor nodes may be identified by using a "Hello" protocol. Each node using the Hello protocol may periodically broadcast a "Hello" message that includes an identifier of the node. A collection of identifiers received via Hello messages during a particular interval may be used to generate a digest. A particular node may broadcast its digest via subsequent Hello messages. To illustrate, the first node 101 of FIGS. 1-6 may determine based on received Hello messages that the second node 102, the third node 103 and the fourth node 104 are neighbor nodes (e.g., one-hop neighbors). A one-hop neighbor of a particular node is a node that can communicate directly with the particular node via wireless signaling (i.e., without routing the communication through another node). The first node 101 may then send out one or more Hello messages identifying the first node 101 and indicating that the second node 102, the third node 103 and the fourth node 104 are neighbor nodes of the first node 101. Other nodes of the network may also generate digests which the other nodes also transmit via Hello messages.

A particular node may generate a list of its nearest neighbor nodes (or one-hop neighbors) by examining received digests. To illustrate, the second node 102 may receive the Hello message including the digest information from the first node 101. The Hello message received from the first node 101 may include an identifier of the first node 101 as a sender. The second node 102 may add the identifier of the first node 101 to a digest of the second node 102 in response to receiving the Hello message from the first node 101. The second node 102 may also broadcast a Hello message that includes the digest of the second node 102. The first node 101 may receive the Hello message from the second node 102 and may examine the digest of the second node 102 to determine whether the identifier of the first node 101 is present in the digest. Presence of the identifier of the first node 101 in the digest of the second node 102 may provide confirmation to the first node 101 that communication between the first node 101 and the second node 102 is symmetric (e.g., one-hop in each direction).

In a particular embodiment, a node may also use digest information to identify the node's two-hop neighbors (i.e., nearest neighbors of its nearest neighbors). For example, each node of the network may broadcast its digests via Hello messages. Each node may label its own one-hop neighbors in its digest. For example, the first node 101 may transmit a Hello message that includes a digest of the first node 101. The digest of the first node 101 may identify the second node 102, the third node 103 and the fourth node 104 as one-hop neighbors of the first node 101. The second node 102 may compare the digest of the first node 101 to a digest of the second node 102. The digest of the second node 102 may identify the first node 101 and the fourth node 104 as the second node's one-hop neighbors. Based on the comparison of the digests, the second node 102 may identify one-hop neighbors of the first node 101 that are not one-hop neighbors of the second node 102. In this example, the third node 103 is a one-hop neighbor of the first node 101 and is not a one-hop neighbor of the second node 102. Thus, the third node 103 may be identified a two-hop neighbor of the second node 102. The second node 102 may store an identifier of the third node 103 in a list of two-hop neighbors. The second node 102 may also tag the identifier of the third node 103 with information indicating which nodes of the network 100 identified the third node 103 as a one-hop neighbor in a most recently receive Hello message. In this particular example, the third node 103 is a one-hop neighbor of the first node 101 and of the fourth node 104. Thus, the second node 102 may tag the identifier of the third node 103 with information indicating that the third node 103 is a one-hop neighbor of the first node 101 and of the fourth node 104.

In response to detecting a suspicious node, at 802, a node may use the node's digest information and a list of two-hop neighbors to attempt to identify a set of nodes to be invited to join a sub-network to sandbox the suspect node. To illustrate, if the second node 102 determines that the fourth node 104 (also referred to as the suspect node 104) is suspicious, the second node 102 may use information about the one-hop neighbors and two-hop neighbors of the second node 102 and information about the one-hop neighbors of other nodes to identify one-hop neighbors of the suspect node 104.

The method 704 may also include, at 804, sending an invitation message to each of the identified neighbor nodes of the suspect node. The invitation message that is sent to a particular neighbor node may be encrypted using an encryption key associated with the particular neighbor node. For example, referring to FIG. 2, the first node 101 may detect that the fourth node 104 is a suspect node. In response, the first node 101 may access digest information to identify neighbor nodes of the suspect node 104. The first node 101 may send an invitation to each of the neighbor nodes, including the second node 102 and the third node 103 in this example. The invitation sent to each of the neighbor nodes may be encrypted in a manner that is only accessible by the particular node to which the invitation is sent. For example, the first node 101 may encrypt the invitation message sent to the second node 102 using an encryption key that is associated with the second node 102.

In a particular circumstance, a node may determine that it is the only identified one-hop neighbor of the suspect node. For example, the suspect node may be a gateway that provides the node with access to other nodes of the network. In this circumstance, the node may not attempt to form a sub-network since the node cannot communicate directly with other potential members of the sub-network. Rather, the node may initiate countermeasures without assistance of other nodes of the network. For example, the node may log information about the suspect node or perform other actions. In a similar circumstance, the suspect node may be positioned within the network such that a first set of one-hop neighbors of the suspect node can only communicate with a second set of one-hop neighbors of the suspect node through the suspect node. To illustrate, the suspect node may be a gateway or bottleneck node between the two portions of the network. In this circumstance, the first set of one-hop neighbors of the suspect node may set up a first sub-network and the second set of one-hop neighbor may set up a separate and independent second sub-network.

In a particular circumstance, a node may determine that it cannot communicate directly with each identified one-hop neighbor of the suspect node. In this circumstance, one or more of the identified one-hop neighbors of the suspect node may not be trusted. For example, when the only digest that identified a particular node as a one-hop neighbor of the suspect node was received from the suspect node, then it is possible that the one-hop neighbor node has been falsified by the suspect node as part of malicious activity by the suspect node. To illustrate, the one-hop neighbor node may be a honey pot set up by the suspect node. To guard against this possibility, the node forming the sub-network may exclude nodes that are only identified by the suspect node from the list of nodes invited to be members of the sub-network. If it becomes evident later that an excluded node is trustworthy, the excluded node may be added to the sub-network by expanding the sub-network as described with reference to FIG. 4.

The method 704 may also include, at 806, sending a sub-network formation message to one or more nodes that are invited to join the sub-network. For example, after the second node 102 and the third node 103 have acknowledged the invitation to join the sub-network from the first node 101, the first node 101 may send the sub-network formation message. The sub-network formation message sent to a particular node may be encrypted using an encryption key associated with the particular node. The sub-network formation message may include, for example, a roster that identifies the members of the sub-network, a time-to-live of the sub-network, and encryption information associated with the sub-network. The encryption information may include a shared key that is provided only to members of the sub-network or may include public key encryption information that is provided to members of the sub-network. The time-to-live of the sub-network may be a randomized (e.g., random, pseudo-random, or semi-random) length of time that is assigned as a duration of existence of the sub-network. For example, the sub-network may be re-formed occasionally in order to further secure the sub-network against intrusion or access by a malicious party.

Figure 9:
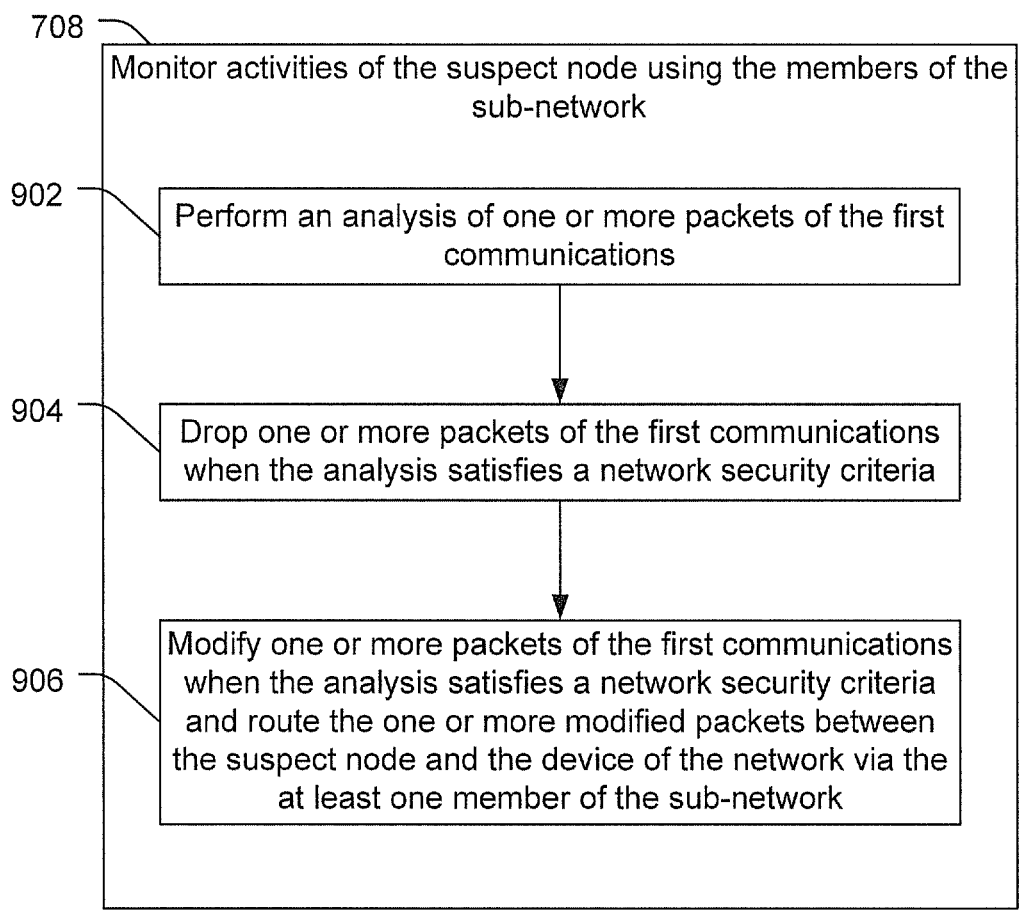
FIG. 9 is a flow chart of a particular embodiment of a method of monitoring a suspect node of a network.

FIG. 9 is flow chart of a particular embodiment of a method of monitoring activities of a suspect node. In particular, FIG. 9 provides additional detail regarding a particular method of monitoring activities of a suspect node, which may correspond to the method 708 of monitoring activities of a suspect node of FIG. 7. The method 708 may be performed by a node of a network, such as one of the nodes 101-103 of the wireless network 100 of FIGS. 1-6 (wherein the fourth node 104 is the suspect node).

The method may include, at 902, performing an analysis of one or more packets of first communications on a network. First communications here refers to communications within the network that are unrelated to the sub-network (e.g., communication on the network that are not related to formation and administration of the sub-network). For example, referring to FIG. 2, the first communications may include the first communication 108 that are sent between members of the network 100 including the suspect node 104. The analysis of the packets communicated via the first communications may include analyzing information that has been accessed by, sent to, or received from the suspect node.

The method may include, at 904, dropping one or more packets of the first communications when the analysis satisfies a network security criteria. For example, the network security criteria may specify that a particular mode of communication, such as a real-time mode of communication, be made unavailable to the suspect node. Thus, when the analysis indicates that a packet received from the suspect node or sent to the suspect node includes data related to a real-time communication mode (e.g., a chat data packet, a voice data packet, a video data packet, etc.) or data sent via a protocol used for real-time communications (e.g., a voice-over-internet protocol), the packet may be dropped. In another example, access to specific nodes of the network may be disabled. Accordingly, when the analysis indicates that a data packet is directed to the specific node from the suspect node or is directed to the suspect node from the specific node, the data packet may be dropped.

The method may also include, at 906, modifying one or more packets of the first communications when the analysis satisfies the network security criteria and routing the one or more modified data packets between the suspect node and a particular device of the network via at least one member of the sub-network. For example, information that is being sent to the suspect node from the particular device may be modified such that the suspect node is provided false information. In another example, information received from the suspect node and directed to the particular device may be modified to remove potentially harmful information or for other purposes. To illustrate, communications received from the suspect node may be filtered to remove potential malicious software from the communications before the communications are provided to other members of the network. In this manner, the other members of the network may be able to respond to the suspect node as though the information that was sent from the suspect node has been received and thereby not alert the suspect node that the malicious software has been removed.

Figure 10:
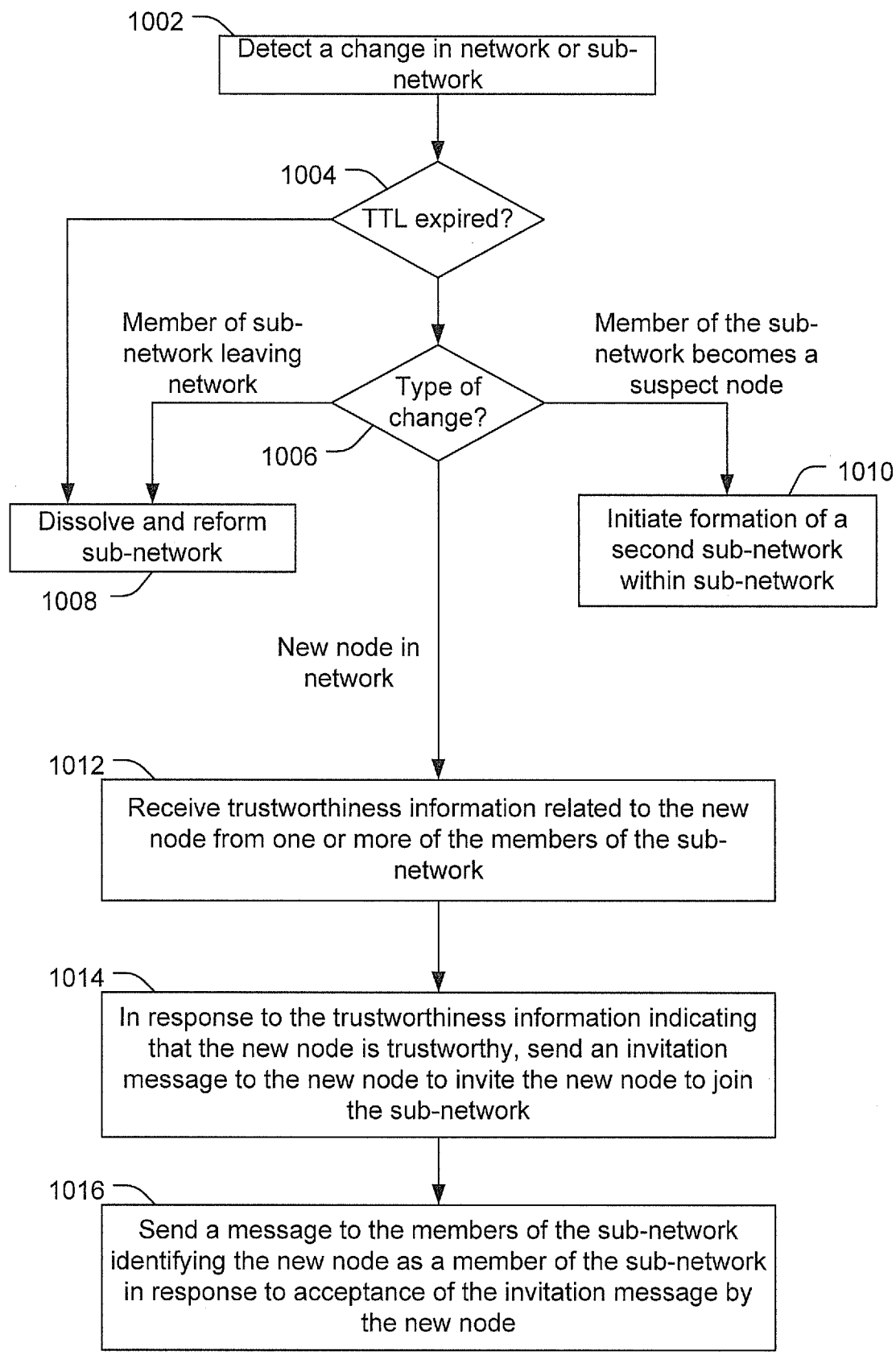
FIG. 10 is a flow chart of a particular embodiment of a method of responding to a change in a network or in a sub-network.

FIG. 10 is a flow chart of a particular embodiment of a method of responding to a change in a network or in a sub-network. The method may be performed by a node of a network, such as one of the nodes 101-104 of the wireless network 100 of FIGS. 1-6.

The method may include, at 1002, detecting a change in the network or the sub-network. For example, the change may include expiration of a time-to-live of the sub-network, addition of a node to the network, a member of the sub-network leaving, a member of the sub-network coming under suspicion, or another change of the network or the sub-network.

The method may include, at 1004, determining whether the change includes expiration of the time-to-live of the sub-network. When the time-to-live of the sub-network has expired, the sub-network may be dissolved and reformed, at 1008. For example, a new sub-network formation invitation may be sent to nodes of the network that are to be invited to the reformed sub-network. A new sub-network formation message may be sent to the nodes that accept that invitation. The new sub-network formation message may include sub-network administration information, such as a roster of members of the new sub-network, encryption information of the new sub-network, and a time-to-live of the new sub-network.

The method may include, at 1006, determining a type of the change in the network or the sub-network. When the type of the change includes a member of the sub-network leaving the network or leaving a range of the sub-network, the method may include dissolving and reforming the sub-network, at 1008. For example, as described with reference to FIG. 5, when the third node 103 leaves the sub-network 202 (not shown in FIG. 5), other members of the sub-network 202 may form the new sub-network 502.

When the type of change includes a member of the sub-network becoming a suspect node, the method may include, at 1010, initiating formation of a second sub-network within the sub-network. For example, as described with reference to FIG. 3, when the second node 102 becomes a suspect node, the first node 101 and the third node 103 may form the second sub-network 302.

When the type of change includes addition of a new node to the network, the method may include, at 1012, receiving trustworthiness information related to the new node from one or more members of the sub-network. In response to the trustworthiness information indicating that the new node is trustworthy, the method may include, at 1014, sending an invitation message to the new node to invite the new node to join the sub-network. The method may also include, at 1016, sending a message to members of the sub-network identifying the new node as a member of the sub-network in response to acceptance of the invitation message by the new node. For example, as described with reference to FIG. 4, when the fifth node 401 enters the network 100, the members of the sub-network 202 may determine whether the fifth node 401 is trustworthy and may form the expanded sub-network 402 when the fifth node 401 is determined to be trustworthy.

The method and systems disclosed enable securing networks, especially ad hoc wireless networks, against threats from malicious nodes. In particular, the methods and systems enable sandboxing suspicious nodes in a manner designed to not alert the suspicious node that it has been detected.

Figure 11:
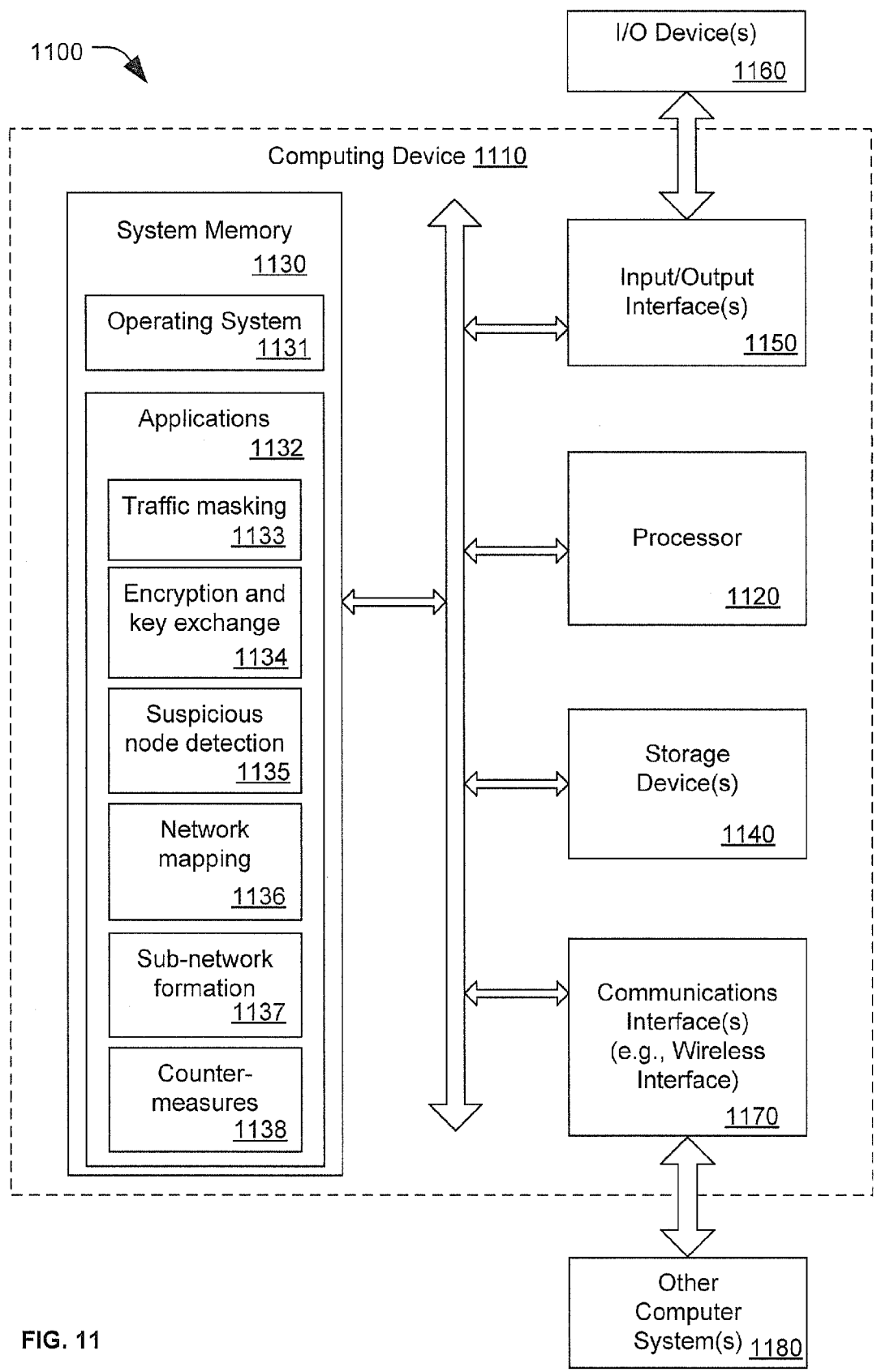
FIG. 11 is a block diagram of a computer system adapted to perform in a method of providing security for a wireless network.

FIG. 11 is a block diagram of a computer system 1100 adapted to perform a method of providing security for a wireless network. The computing system 1100 includes a computing device 1110, which may include or be included within one or more nodes of the wireless network. For example, the computing device 1110 may include or be included within one or more of the nodes 101-104 of FIGS. 1-6, the fifth node 401 of FIG. 4, a device of the network 204 of FIG. 2, or any combination thereof.

In an illustrative embodiment, the computing device 1110 includes at least one processor 1120. The processor 1120 may be configured to execute instructions to implement communications via the wireless network, to provide security to the wireless network, to perform other functions, or a combination thereof. The computing device 1110 may also include one or more memory devices, such as a system memory 1130, one or more storage devices 1140, or both. The memory devices may store instructions that are executable by the processor 1120, data related to the computing device 1110, data related to the instructions or the wireless network (e.g., configuration data, protocol specifications, network topology information, encryption information), data related to another purpose of the computing device 1110 (e.g., data related to providing a particular resource to members of the wireless network), other information, or any combination thereof. The computing device 1110 may also include and input/output interfaces 1150 that enables data to be exchanged with one or more input/output devices 1160 and one or more communication interfaces 1170 that enables data to be exchanged with one or more other computer system 1180. For example, the communications interfaces 1170 may include a wireless network interface.

The memory devices 1130 and 1140 may include random access memory (RAM) devices, and nonvolatile memory devices, such as read-only memory (ROM), programmable read-only memory, flash memory, etc. One or more of the memory devices 1130 and 1140 may include an operating system 1131, which may include a basic input/output system (BIOS) for booting the computing device 1110 as well as instructions that enable the computing device 1110 to interact with users, other programs, and other devices. One or more of the memory devices 1130 and 1140 may also include one or more application programs 1132. For example, the application programs 1132 may include instructions that are executable by the processor 1120 to perform a method of providing security to the wireless network. To illustrate, the application programs 1132 may include traffic masking instructions 1133 that are executable to implement a traffic masking process to obscure a pattern of communications via the wireless network. The application programs 1132 may include encryption and key exchange instructions 1134 that are executable to implement encrypt communications sent via the wireless network, to decrypt communications received via the wireless network, to manage exchange and tracking of keys, to manage other encryption-related tasks or data, or any combination thereof. The application programs 1132 may include suspicious node detection instructions 1135 that are executable to monitor activities on the wireless network to identify suspicious activities of one or more other members of the wireless network. The application programs 1132 may include network mapping instructions 1136 that are executable to track digest information of the computing device 1110 and to exchange the digest information with other nodes of the wireless network. The application programs 1132 may include sub-network formation instructions 1137 that are executable to form and administer a sub-network of the wireless network in response to detection of a suspicious node. The application programs 1132 may include countermeasures instructions 1138 that are executable to implement countermeasures related to a suspicious node, such as formation of a honey pot or honey network, selective packet dropping, communication logging, etc.

Thus, the computing device 1110 may be operable to facilitate wireless communication with other nodes of the wireless network. The computing device 1110 may also be operable to identify a suspect node of the network and to initiate formation of a sub-network of the network in response to identifying the suspect node. The sub-network may be configured to enable secure wireless communication between members of the sub-network, where the suspect node is not a member of the sub-network. The sub-network may also allow communication to and from the suspect node via the wireless network. Thus, the suspect node may be sandboxed within the wireless network without the suspect node being alerted that it has been detected.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:
1. A computer-implemented method comprising:
identifying a suspect node of a network that includes multiple nodes in wireless communication;
in response to identifying the suspect node, initiating formation of a sub-network of the network by:
identifying one or more neighbor nodes of the suspect node; and
sending an invitation message to each neighbor node of the one or more neighbor nodes to invite the neighbor node to the sub-network, wherein the invitation message sent to a first particular neighbor node is encrypted using an encryption key associated with the first particular neighbor node, and wherein the invitation message is not sent to a second particular node that is only identified as a neighbor node by the suspect node;
wherein the suspect node is not a member of the sub-network, wherein, after formation of the sub-network, first communications between the suspect node and a device of the network are routed to or through at least one of the members of the sub-network, and wherein the sub-network is configured to enable second communications between members of the sub-network, wherein the second communications are communicated in a manner that is secured against access by the suspect node; and implementing a traffic masking process that obscures a pattern of communications within the network, wherein the traffic masking process includes communicating dummy packets via the network to obscure the pattern of the communications within the network, and wherein existence of the sub-network is masked from the suspect node by replacing one or more of the dummy packets with one or more packets of the second communications.

2. The method of claim 1, wherein initiating formation of the sub-network comprises sending a sub-network formation message including sub-network encryption information to one or more nodes that are invited to join the sub-network, wherein the sub-network formation message sent to a particular node is encrypted using an encryption key associated with the particular node.

3. The method of claim 2, wherein the members of the sub-network send the second communications using the sub-network encryption information after formation of the sub-network.

4. The method of claim 1, further comprising performing an analysis of one or more packets of the first communications, including analyzing information that has been accessed by, sent to, or received from the suspect node.

5. The method of claim 4, further comprising dropping the one or more packets of the first communications when the analysis satisfies a network security criteria.

6. The method of claim 4, further comprising:
when the analysis satisfies a network security criteria, modifying the one or more packets of the first communications to at least one of: provide false information to the suspect node, remove potentially harmful information received from the suspect node, or remove potential malicious software received from the suspect node; and
routing the one or more modified packets between the suspect node and the device of the network via the at least one member of the sub-network.

7. The method of claim 1, further comprising, after formation of the sub-network:
detecting a change of status of a particular member node of the sub-network; and
in response to detecting the change of status of the particular member node, initiating formation of a second sub-network of the network.

8. The method of claim 7, wherein the change of status is from a trusted status to a suspect status, and wherein, in addition to enabling the first communications and the second communications, the second sub-network enables third communications between members of the second sub-network, wherein the third communications are secured against access by the particular member node of the sub-network.

9. The method of claim 7, wherein the second sub-network is nested within the sub-network.

10. The method of claim 7, wherein the change of status indicates that the particular member node is disconnected from the network, and wherein the second sub-network is configured to enable the first communications and the second communications without the particular member node.

11. The method of claim 1, further comprising, after formation of the sub-network:
detecting a new node of the network;
sending an invitation message to the new node to invite the new node to join the sub-network; and
in response to acceptance of the invitation message by the new node, sending a message to the members of the sub-network identifying the new node as a member of the sub-network.

12. The method of claim 11, further comprising, before sending the invitation message to the new node, receiving trustworthiness information related to the new node from one or more of the members of the sub-network, wherein the invitation message is sent in response to the trustworthiness information indicating that the new node is trustworthy.

13. The method of claim 1, further comprising implementing a countermeasure related to the suspect node, wherein implementing the countermeasure includes at least one of: generating a honey pot to entice the suspect node to attempt to gain access to the honey pot, or generating a honey network to entice the suspect node to attempt to gain access to the honey network.

14. A device comprising:
a wireless network interface to facilitate wireless communication with nodes of a network;
a processor coupled to the wireless network interface; and
at least one memory device accessible to the processor, the at least one memory device storing processor-executable instructions that, when executed by the processor, cause the processor to:
identify a suspect node of the network;
initiate formation of a sub-network of the network in response to identifying the suspect node, wherein initiating formation of the sub-network includes:
identifying one or more neighbor nodes of the suspect node; and
sending an invitation message to each neighbor node of the one or more neighbor nodes to invite the neighbor node to the sub-network, wherein the invitation message sent to a first particular neighbor node is encrypted using an encryption key associated with the first particular neighbor node, and wherein the invitation message is not sent to a second particular node that is only identified as a neighbor node by the suspect node;
wherein the sub-network enables secure wireless communication between members of the sub-network via second communications, wherein the second communications are communicated in a manner that is secured against access by the suspect node, wherein the suspect node is not a member of the sub-network, and wherein, after formation of the sub-network, the suspect node is able to communicate via the network; and
implement a traffic masking process that obscures a pattern of communications within the network, wherein the traffic masking process includes communicating dummy packets via the network to obscure the pattern of the communications within the network, and wherein existence of the sub-network is masked from the suspect node by replacing one or more of the dummy packets with one or more packets of the second communications.

15. The device of claim 14, wherein the processor-executable instructions are executable by the processor to select one or more nodes to be invited to the sub-network based on routing information of the network.

16. The device of claim 15, wherein the routing information includes a digest that indicates a number of routing hops between two or more of the nodes.

17. The device of claim 15, wherein the routing information is determined using:
a first digest that includes an identifier of each one-hop node of the device, wherein a one-hop node is a node that can communicate with the device directly via wireless signaling; and one or more second digests, wherein each second digest includes identifiers of one-hop nodes of a particular one-hop node of the device.

18. The device of claim 14, wherein the processor-executable instructions are executable by the processor to, after formation of the sub-network, generate a log of messages that are received by at least one member of the sub-network and that are directed to the suspect node or received from the suspect node.

19. A non-transitory computer-readable storage medium comprising processor-executable instructions that, when executed by a processor, cause the processor to:
   identify a suspect node of a network that includes multiple nodes in wireless communication;
   in response to identifying the suspect node, initiate formation of a sub-network of the network by:
      identifying one or more neighbor nodes of the suspect node; and
   sending an invitation message to each neighbor node of the one or more neighbor nodes to invite the neighbor node to the sub-network, wherein the invitation message sent to a first particular neighbor node is encrypted using an encryption key associated with the first particular neighbor node, and wherein the invitation message is not sent to a second particular node that is only identified as a neighbor node by the suspect node;
      wherein the suspect node is not a member of the sub-network, wherein, after formation of the sub-network, first communications between the suspect node and a device of the network are routed to or through at least one of the members of the sub-network, and wherein the sub-network is configured to enable second communications between members of the sub-network, wherein the second communications are communicated in a manner that is secured against access by the suspect node; and
   implement a traffic masking process that obscures a pattern of communications within the network, wherein the traffic masking process includes communicating dummy packets via the network to obscure the pattern of the communications within the network, and wherein existence of the sub-network is masked from the suspect node by replacing one or more of the dummy packets with one or more packets of the second communications.

20. The non-transitory computer-readable storage medium of claim 19, wherein the instructions are further executable by the processor to initiate formation of a second sub-network in response to detection of expiration of a time-to-live of the sub-network.

21. The non-transitory computer-readable storage medium of claim 19, wherein the instructions are further executable by the processor to implement link layer encryption of communications between members of the sub-network.

* * * * *